(12) United States Patent
Zisch (10) Patent No.: US 10,843,712 B2
(45) Date of Patent: Nov. 24, 2020

(54) TRANSPORT DEVICE FOR TRANSPORTING GOODS

(71) Applicant: SIEMENS AKTIENGESELLSCHAFT, Munich (DE)

(72) Inventor: Rainer Zisch, Oehningen (DE)

(73) Assignee: Siemens Aktiengesellschaf, Munich (DE)

( * ) Notice: Subject to any disclaimer, the term of this patent is extended or adjusted under 35 U.S.C. 154(b) by 385 days.

(21) Appl. No.: 15/311,595

(22) PCT Filed: Apr. 9, 2015

(86) PCT No.: PCT/EP2015/057689
§ 371 (c)(1),
(2) Date: Nov. 16, 2016

(87) PCT Pub. No.: WO2015/172944
PCT Pub. Date: Nov. 19, 2015

(65) Prior Publication Data
US 2017/0088148 A1    Mar. 30, 2017

(30) Foreign Application Priority Data
May 16, 2014   (DE) .................. 10 2014 209 378

(51) Int. Cl.
*B61B 13/12*   (2006.01)
*B65G 35/06*   (2006.01)
*B65G 35/08*   (2006.01)

(52) U.S. Cl.
CPC ............ *B61B 13/12* (2013.01); *B61B 13/127* (2013.01); *B65G 35/06* (2013.01); *B65G 35/08* (2013.01)

(58) Field of Classification Search
CPC ....... B61B 13/12; B61B 13/00; B61B 13/127; B65G 35/08; B65G 35/06
See application file for complete search history.

(56) References Cited

U.S. PATENT DOCUMENTS

| | | |
|---|---|---|
| 3,747,535 A | 7/1973 | Zuppiger |
| 4,023,501 A | 5/1977 | Haldimann |
| 4,991,516 A | 2/1991 | Rixen et al. |
| 5,121,830 A | 6/1992 | Sakamoto et al. |
| 5,134,940 A | 8/1992 | Fujita et al. |

(Continued)

FOREIGN PATENT DOCUMENTS

| | | |
|---|---|---|
| DE | 3826830 A1 | 4/1989 |
| DE | 69011744 T2 | 3/1995 |

(Continued)

*Primary Examiner* — Scott A Browne
(74) *Attorney, Agent, or Firm* — Laurence Greenberg; Werner Stemer; Ralph Locher (57) ABSTRACT

A transport device for transporting goods includes at least one track and at least one transport vehicle which is configured to travel on the track and to transport the goods. The transport vehicle has at least one vehicle-side or on-board drive for moving the transport vehicle relative to the track. In order to enhance the performance of the transport device in a simple and cost-effective manner, the track has at least one track-side or in-track drive for moving the transport vehicle relative to the track at least in sections.

15 Claims, 8 Drawing Sheets

(56) References Cited

U.S. PATENT DOCUMENTS

| | | | | |
|---|---|---|---|---|
| 5,517,923 | A * | 5/1996 | Cathiard | B61B 9/00 |
| | | | | 104/173.1 |
| 6,612,246 | B2 * | 9/2003 | Kumar | B60L 7/22 |
| | | | | 105/34.2 |
| 2004/0261648 | A1 * | 12/2004 | Nishihara | B61B 13/127 |
| | | | | 104/163 |
| 2008/0276827 | A1 | 11/2008 | Roeckle et al. | |
| 2012/0312327 | A1 * | 12/2012 | Morimoto | B65G 45/00 |
| | | | | 134/21 |
| 2013/0213755 | A1 * | 8/2013 | Shibata | B61B 3/02 |
| | | | | 191/22 R |
| 2013/0313071 | A1 * | 11/2013 | Kasuya | B65G 35/06 |
| | | | | 198/375 |
| 2014/0090954 | A1 * | 4/2014 | Murayama | H01L 21/67715 |
| | | | | 198/348 |

FOREIGN PATENT DOCUMENTS

| | | | |
|---|---|---|---|
| DE | 4032487 | C2 | 10/1997 |
| DE | 19744446 | B4 | 9/2006 |
| DE | 102005034582 | B4 | 11/2007 |
| EP | 0367972 | B1 | 11/1993 |
| EP | 0678433 | A1 | 10/1995 |
| EP | 2610099 | A1 | 7/2013 |

\* cited by examiner

TRANSPORT DEVICE FOR TRANSPORTING GOODS

BACKGROUND OF THE INVENTION

Field of the Invention

The invention relates to a transport device for transporting goods, having at least one track and having at least one transport vehicle designed to travel on the track and to transport the goods, and which has at least one on-board drive for moving the transport vehicle relative to the track.

Transport devices of the above-mentioned type are known to from the prior art and are described, for example, in EP0367972 B1. Here the transport vehicle is provided with an autonomous on-board drive by which the transport vehicle can move on the track independently of any other transport vehicles. The transport device of EP0367972 E1 is designed to transport workpieces, but such transport devices can also be used for transporting items such as pieces of luggage, packages or similar. Other known transport devices are described in U.S. Pat. No. 3,747,535, DE 40 32 487 C2 and DE 690 11 744 T2.

The on-board drive of the transport vehicle, which can also be termed an autonomous vehicle, is designed to accelerate the transport vehicle to a predetermined normal speed. As an on-board drive, each transport vehicle comprises, for example, an electric motor with corresponding transmission and friction wheel. A low normal speed is advantageous because it makes the drive less expensive, this being a considerable cost factor if there are a large number of autonomous vehicles. On the other hand, the throughput of the transport device in terms of goods transported per unit time of the transport device is also dependent on the normal speed of the transport vehicles.

BRIEF SUMMARY OF THE INVENTION

The object of the present invention is therefore to provide a transport device of the type mentioned in the introduction which can be produced with low manufacturing costs while nevertheless providing as high a throughput as possible.

This object is inventively achieved for the above-mentioned transport device by providing the track with at least one in-track drive by means of which the transport vehicle can be moved relative to the track at least in sections.

The advantage of the solution according to the invention is that an inexpensive on-board drive with limited transport speed can be used, but with the in-track drive providing additional acceleration of the transport vehicle independently of the on-board drive. A higher throughput of the transport device can therefore be achieved.

The inventive solution can be further developed by advantageous embodiments which can be combined independently of one another.

Thus the on-board drive can be designed to move the transport vehicle at a variable transport speed and the in-track drive can be designed to move the transport vehicle, at a constant transport speed. The advantage of this is that the in-track drive is relatively inexpensive to manufacture and moves the transport vehicle at a constant speed. The variable speed on-board drive can move the transport vehicle very flexibly, independently of other vehicles and in a manner commensurate with the track and the transport situation.

In order to ensure particularly smooth passage of the transport vehicle onto a region of the track having an in-track drive, the in-track drive can have at least one movable contact means, wherein the movable contact means can be operatively connected to the on-board drive at least temporarily such that a relative movement between the transport vehicle and the movable contact means can be produced. Thus the on-board drive cannot be activated until the transport vehicle is already on the in-track drive. The transport vehicle is then additionally accelerated by the on-board drive while already being moved at constant speed by the in-track drive.

In order to optimize the transition to the in-track drive, the track running in a direction of travel can have at least one fixed contact means which during operation is operatively connected temporarily to the on-board drive and is disposed at a distance from the in-track drive in the direction of travel. In particular, the distance can be made at least large enough to ensure that, when the transport vehicle moves past, it is for a while not operatively connected to the track. Thus the on-board drive can be stopped in the region of no operative connection to the track, and, as a result, the stopping has no effect on the forward speed of the transport vehicle. The transport vehicle with its on-board drive stopped then passes onto the in-track drive running at constant speed. Thereafter the on-board drive can be reactivated and slowly accelerated in order to increase the transport speed of the transport vehicle above that of the in-track drive.

In order to be able to control the transport vehicle on the track at all times, the transport vehicle can have at least two on-board drives disposed one behind the other in the direction of travel. Thus at least one of the two on-board drives is engaged—i.e. operatively connected—while the other on-board drive is disposed in the gap or the distance between the in-track drive and the fixed contact means. Alternatively, this advantage can also be achieved by the transport device having at least two transport vehicles disposed one behind the other in the direction of travel and connected to one another.

In order to ensure an even smoother transition of the transport vehicle to the in-track drive, the constant drive speed of the in-track drive can be essentially equal to a normal speed, and the on-board drive can be designed such that the on-board drive accelerates or decelerates the transport vehicle to at least to the normal speed. As a result, the transport vehicle can be accelerated or decelerated to the normal speed in advance of the in-track drive and therefore transition smoothly and without juddering to the in-track drive operating at normal speed.

In order to provide a simple means of increasing the maximum speed of the transport vehicle still further, the transport device can have at least two in-track drives disposed one after the other in the direction of travel, the constant drive speeds of which are different. In order to be able to stop the on-board drives between the in-track drives disposed one after the other to ensure a jolt-free transition, the in-track drives can be disposed at a distance from one another in the direction of travel. In particular, the spacing can be made large enough to ensure that the on-board drive is temporarily not operatively connected to the track when the transport vehicle passes over.

In order to fully utilize the possibilities of the transport device according to the invention, the respective drive speeds of the in-track drives can be essentially integral multiples of the normal speed, and the drive speeds in the direction of travel can essentially be increased or reduced by 1× normal speed in each case. Thus the first in-track drive in the direction of travel can be driven at normal speed and the on-board drive additionally accelerates the transport vehicle to altogether twice the normal speed at the end of the first in-track drive. As the next in-track drive in the direction of travel is also being operated at twice the normal speed, the transport vehicle is advanced by the same speeds without jolting. The on-board drive is stopped at the transition from the first to the second in-track drive.

In order to provide an on-board drive of simple design, the on-board drive can have at least one friction wheel.

In addition, the in-track drive can have at least one conveying means. The conveying means can be, for example, a continuous belt conveyor, a conveyor chain or similar. The advantage of this is that the in-track drive can be of simple design and use tried and tested technology.

BRIEF DESCRIPTION OF THE SEVERAL VIEWS OF THE DRAWING

The invention will now be explained with reference to the accompanying drawings in which.

DESCRIPTION OF THE INVENTION

The invention will first be described with reference to FIGS. 1-8 and the exemplary embodiment illustrated therein.

Figure 1:
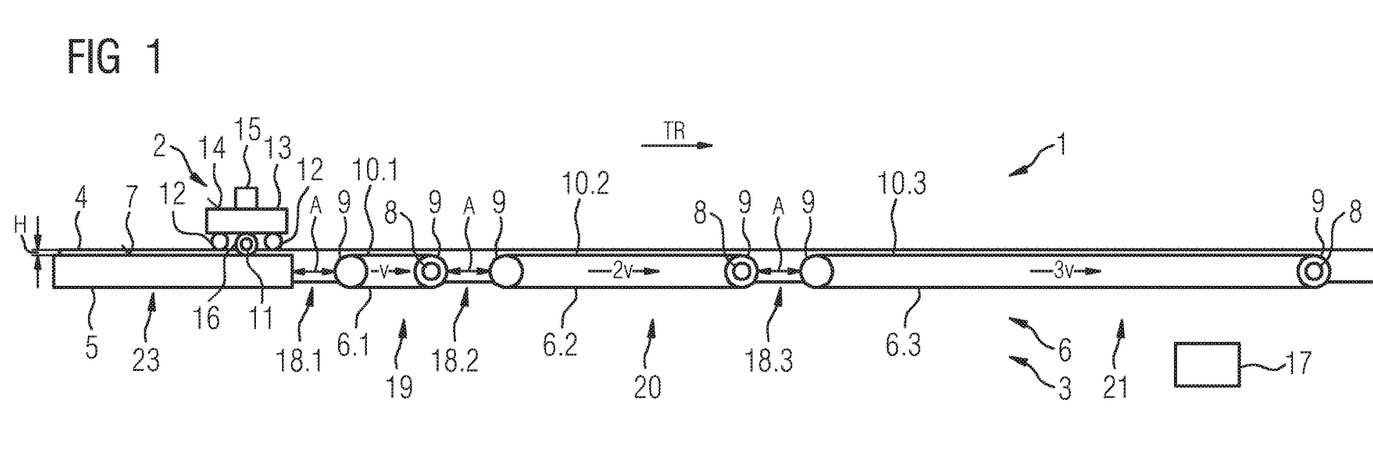
FIG. 1 shows a schematic side view of a first embodiment of the transport device according to the invention.

FIG. 1 schematically illustrates an exemplary embodiment of the inventive transport device 1, comprising at least one transport vehicle 2 and a track 3.

FIG. 1 only shows part of the track 3 of the inventive transport device 1. The track 3 comprises a set of running rails 4, a contact rail 5 as contact means, plurality of in-track drives 6.1, 6.2, 6.3., and a control unit 17.

The set of running rails 4 is designed in known manner as two single rails running parallel to one another. The contact rail 5 is implemented as a single rail and runs slightly below and parallel to the running rails 4. The contact rail 5 has, for example, a flat contact surface 7 which runs parallel to the running rails 4. The in-track drives 6 likewise run in a longitudinal direction of the running rails 4 and are disposed flush with the contact rail 5 between the individual running rails 4. Each in-track drive 6.1, 6.2, 6.3 comprises a drive motor 8, deflection rollers 9, and a belt conveyor 10. In the exemplary embodiment in FIG. 1, the in-track drives 6 are implemented as belt conveyors. Alternatively, a chain drive or a wire rope drive could be used.

The transport vehicle 2 is disposed on the track 3 and has an on-board drive 11, bogie wheels 12, and a vehicle body 13. The vehicle body 13 is designed to transport items 15 such as pieces of luggage or packages. In the schematic representation in FIGS. 1-8, the vehicle body 13 has a receiving surface 14 on which the goods 15 can be accommodated and transported. Self-evidently, instead of the receiving surface 14, the vehicle body 13 can also have a crossbelt, a tilt tray, another transport shell or similar for accommodating the goods 15.

Disposed under the vehicle body 13 are four bogie wheels 12 and the on-board drive 11. The bogie wheels 12 are positioned such that they can run on the running rails 4 and that the transport vehicle 2 can be moved in a rail-manner on the track 3. Each pair of bogie wheels 12 is interconnected via an axle (not shown). The bogie wheels 12 are not driven.

In the exemplary embodiment, in FIGS. 1-8, the on-board drive 11 is implemented as an electric motor with transmission and a friction wheel 16. As an alternative to the friction wheel drive, a form-locking toothed wheel drive or similar would also be conceivable. The friction wheel 16 is disposed such that it is in contact with the contact surface 7 of the contact rail 5 when the transport vehicle 2 is positioned on the track 3 as shown in FIG. 1. A distance H between the contact area of the bogie wheels 12 and the contact area of the friction wheel 16 is essentially identical to the distance H between the top of the running rails 4 and the contact surface 7 of the contact rail 5 or the surface of the belt conveyors 10 of the in-track drives 6. Self-evidently, the distance H between track 3 and transport vehicle 2 can easily be varied in order to achieve a greater frictional force of the friction wheel 16 against the contact rail 5 or the belt conveyors 10.

The in-track drives 6.1, 6.2, 6.3 disposed one after the other in the direction of travel TR are spaced at a distance A from one another and from the contact rail 5. In the embodiment in FIGS. 1-8, the distance A is approximately twice the diameter of the friction wheel 16.

The operation of the inventive transport device 1 in FIGS. 1-8 will now be described.

In the position shown in FIG. 1, the transport vehicle 2 is disposed on the track 3 and the bogie wheels 12 run on the running rails 4. Moreover there is contact between the bogie wheels 12 and the running rails 4 in all the positions shown in FIGS. 1-8. In the position in FIG. 1, the transport vehicle 2 is running at a normal speed v in the direction of travel TR. The on-board drive 11 which is designed as a drive for moving the transport vehicle at variable transport speed is in contact with and therefore operatively connected to the contact rail 5 by the friction wheel 16. The contact rail 5 is disposed in a fixed manner relative to the running rails 4. When the transport vehicle 2 is being moved at normal speed v as shown in FIG. 1, the on-board drive 11 has attained its maximum drive power. The on-board drive 11 can be controlled by the control unit 17 between this maximum power and a stationary state of the friction wheel 16. The control unit 17 is connected in a signal-based manner to the on-board drive and the in-track drives 6.

Figure 2:
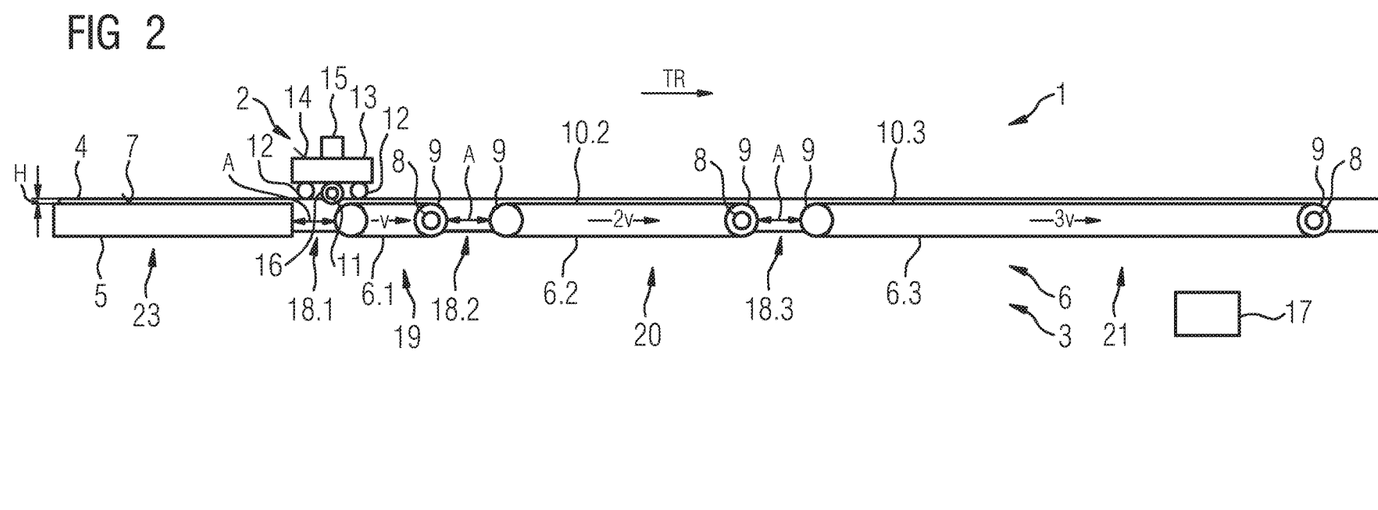
FIGS. 2-8 schematically illustrate the embodiment in FIG. 1 in other positions.

In the position shown in FIG. 2, the transport vehicle has moved forward in the direction of travel TR from the position shown in FIG. 1 and is located in a freewheeling section 18.1 which is constituted by the distance A and in which the friction wheel 16 is in contact neither with the contact rail 5 nor with one of the belt conveyors 10. Because of the inertia, the transport vehicle 2 continues to move at approximately the normal speed v, although the on-board drive is not driving it. Rather the on-board drive 11 was stopped by the control unit 17 as soon as the friction wheel 16 had reached the freewheeling section 18. The first in-track drive 6.1 in the direction of travel TR is driven at an essentially constant transport speed v. Because of the inertia, the transport vehicle 2 also moves at the normal speed v in the freewheeling section 18.1. If the stopped friction wheel 16 then comes into contact with the belt conveyor 10.1 of the in-track drive 6.1, the transport vehicle 2 is moved by the in-track drive 6.1 at the normal speed v in the direction of travel TR. In this first acceleration section 19, the belt conveyor 10.1 of the in-track drive 6.1 is at the same level vertically as the contact rail 5 in the normal section 23 in which the track 3 has no in-track drive 6.

Figure 3:
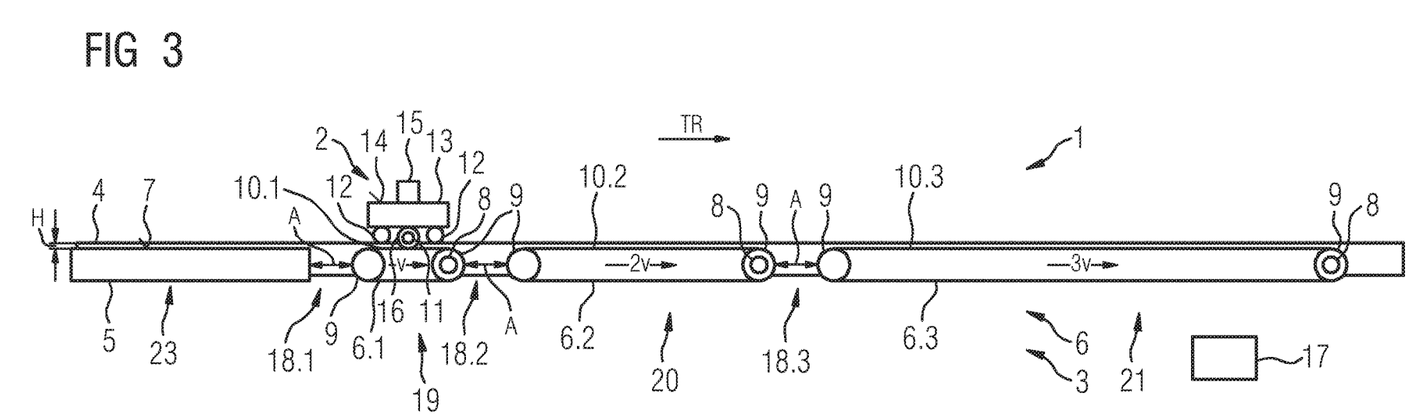

In the position in FIG. 3, the friction wheel 16 of the on-board drive 11 is operatively connected to the belt conveyor 10.1 of the in-track drive 6.1. As it passes through this first acceleration section 19, the initially stopped friction wheel 16 is gradually accelerated to the maximum power of the on-board drive 11 so that a relative movement and relative acceleration takes place between the transport vehicle 2 and the belt conveyor 10.1 of the in-track drive 6.1. As a result, the transport vehicle 2 is accelerated to a transport speed that is greater than the normal speed v. At the end of the first acceleration section 19 the transport vehicle 2 is moving at twice normal speed 2v.

Figure 4:
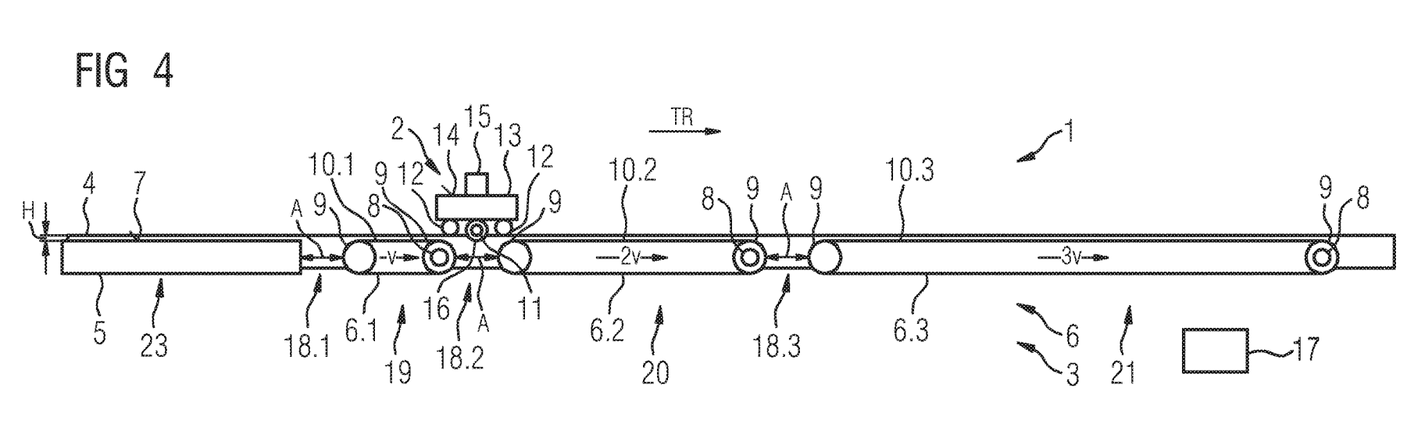
Figure 5:
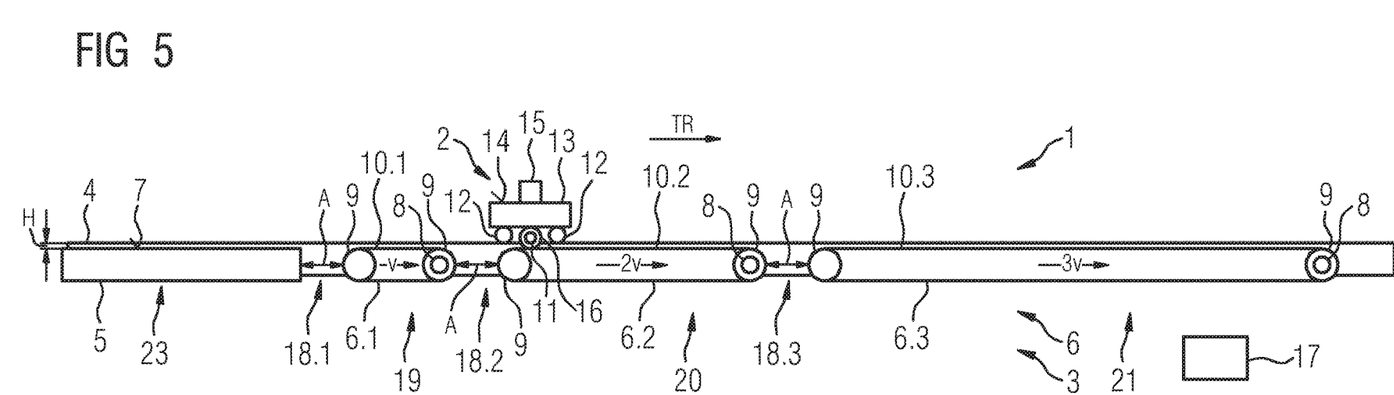
Figure 6:
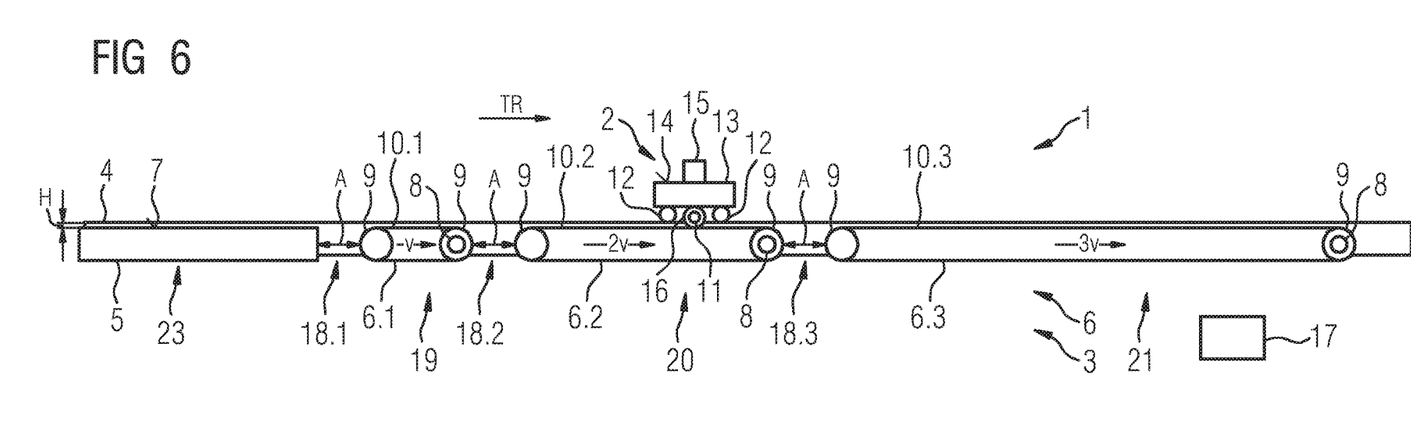

In the position in FIG. 4, the transport vehicle 2 has entered the next freewheeling section 18.2 in which the control unit 17 again stops the on-board drive 11 and the friction wheel 16. Because of the inertia, the transport vehicle 2 continues to be moved at approximately twice normal speed 2v in the direction of travel TR. In the position in FIG. 5, the transport vehicle 2 has already reached the second acceleration section 20 in which the friction wheel 16 is operatively connected to the belt conveyor 10.2 of the next in-track drive 6.2. As it passes through the second acceleration section 20, as shown in FIGS. 5 and 6, the output of the on-board drive is increased from 0 to maximum power so that the transport vehicle 2 leaves the second acceleration section 20 at three times normal speed 3v.

Figure 7:
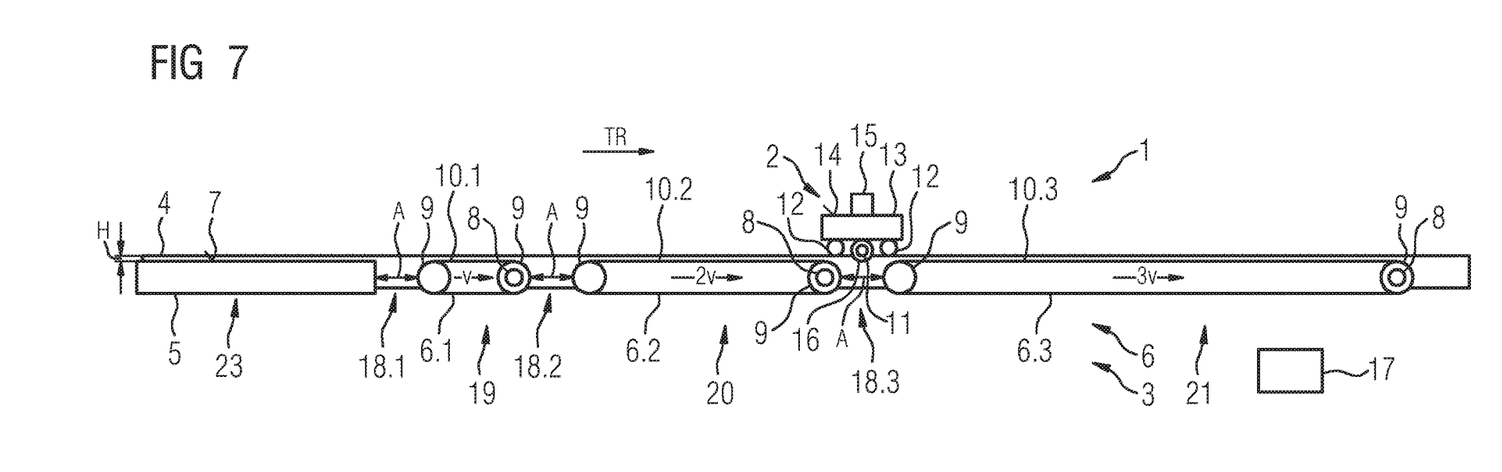

In FIG. 7, the transport vehicle 2 has reached the next freewheeling section 18.3 in which the on-board drive 11 is switched off again. Because of the inertia, the transport vehicle 2 is moved over the freewheeling section 18.3 into the third acceleration section 21.

Figure 8:
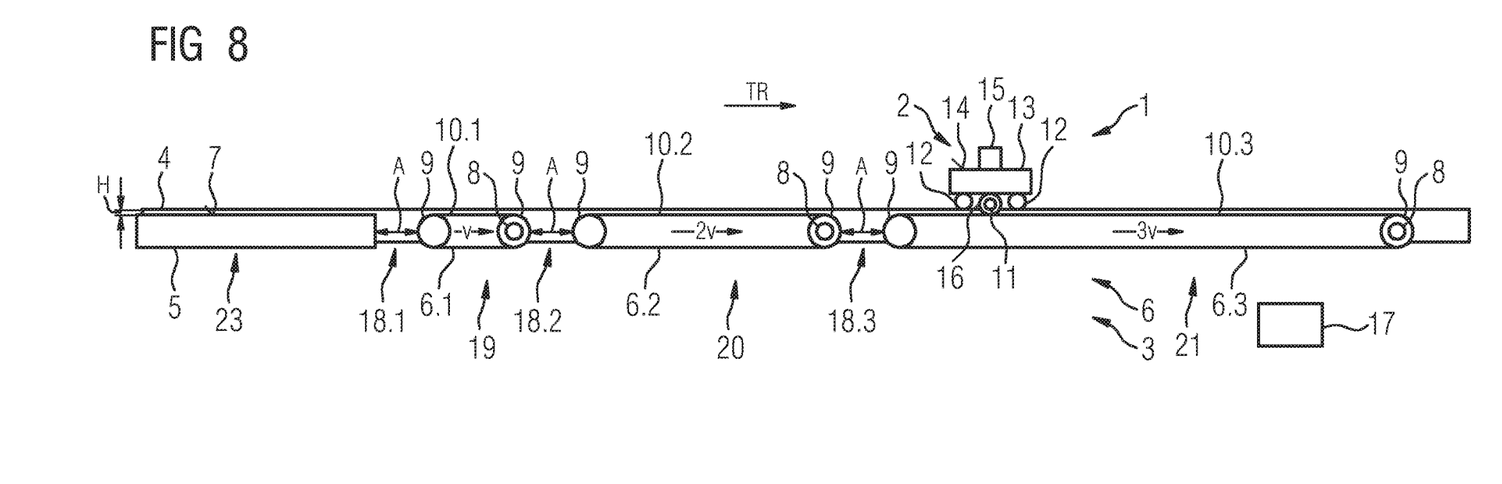

In the position in FIG. 8, the transport vehicle 2 is in the third acceleration section 21 in which the friction wheel 16 of the on-board drive 11 is operatively connected—i.e. in contact or in engagement—with the belt conveyor 10.3 of the in-track drive 6.3. The on-board drive 11 is once again brought to maximum power by is the control unit 17 as it passes through the third acceleration section 21 so that the transport vehicle 2 is accelerated to four times normal speed 4v at the end of the third acceleration section 21.

The present invention enables the transport vehicle 2 to be accelerated to several times normal speed v, even though the on-board drive 11 only allows acceleration up to the normal speed v. Self-evidently additional in-track drives 6 can be used in order to further increase the transport speed of the transport vehicle 2. In order to decelerate the transport vehicle 2 again after it has been accelerated, in-track drives 6 can be used whose speeds reduce relative to one another in the direction of travel TR.

The invention will now be described with reference to the other exemplary embodiment in FIGS. 9-16. For simplicity's sake, only differences with respect to the exemplary embodiment in FIGS. 1-8 will be examined.

The transport vehicle 2 of the embodiment in FIGS. 9-16 has two on-board drives 11 which are disposed one behind the other in the direction of travel TR. A distance 22 between the two on-board drives 11 is greater than the distance A between the in-track drives 6 or rather the contact rail 5. The transport vehicle 2 additionally has four axles each with two bogie wheels 12, as the transport vehicle 2 of the embodiment in FIGS. 9-16 is comprised of two transport vehicles of the embodiment in FIGS. 1-8. Alternatively, the transport vehicle 2 of the embodiment in FIGS. 9-16 could also have only two axles with two bogie wheels 12 each, with the two on-board drives 11 disposed therebetween.

Figure 9:
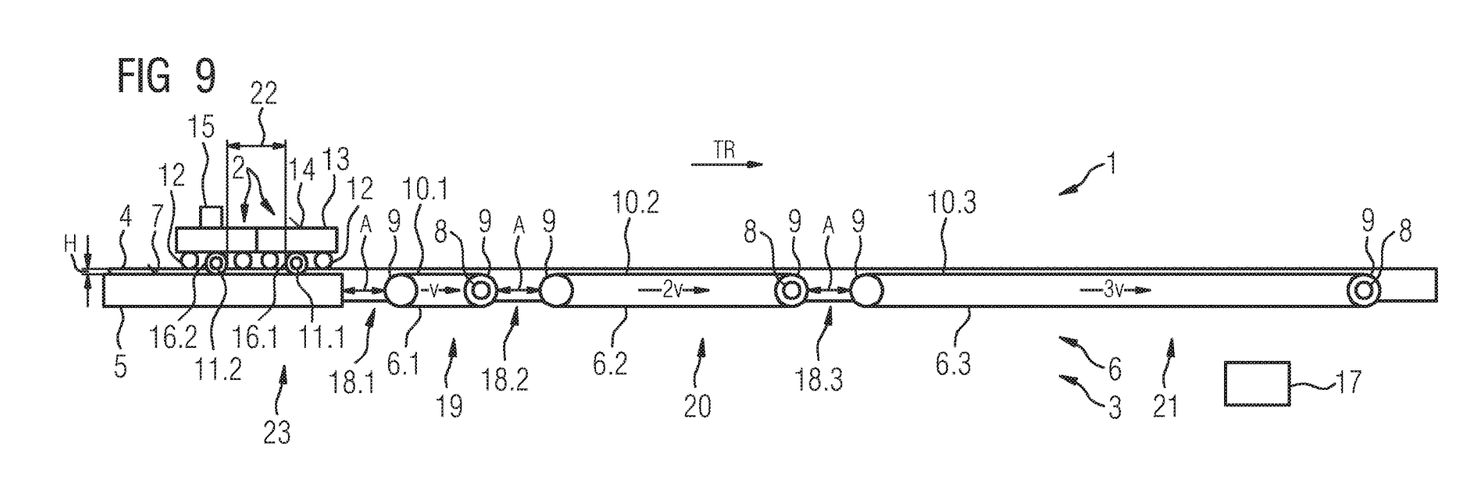
FIG. 9 shows a schematic side view of another exemplary embodiment of the transport device according to the invention.

In the position shown in FIG. 9, the two on-board drives 11 are in the normal section 23 and in contact with the contact rail 5. The transport vehicle 2 moves at normal speed v.

Figure 10:
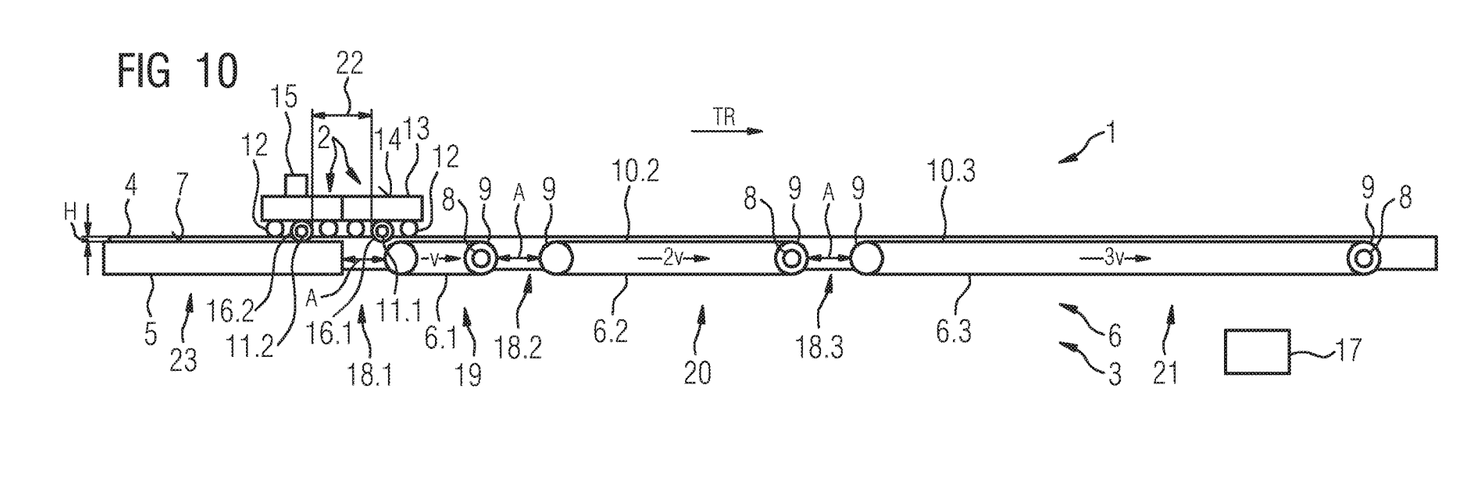
FIGS. 10-16 schematically illustrate the embodiment of FIG. 9 in other positions.
Figure 11:
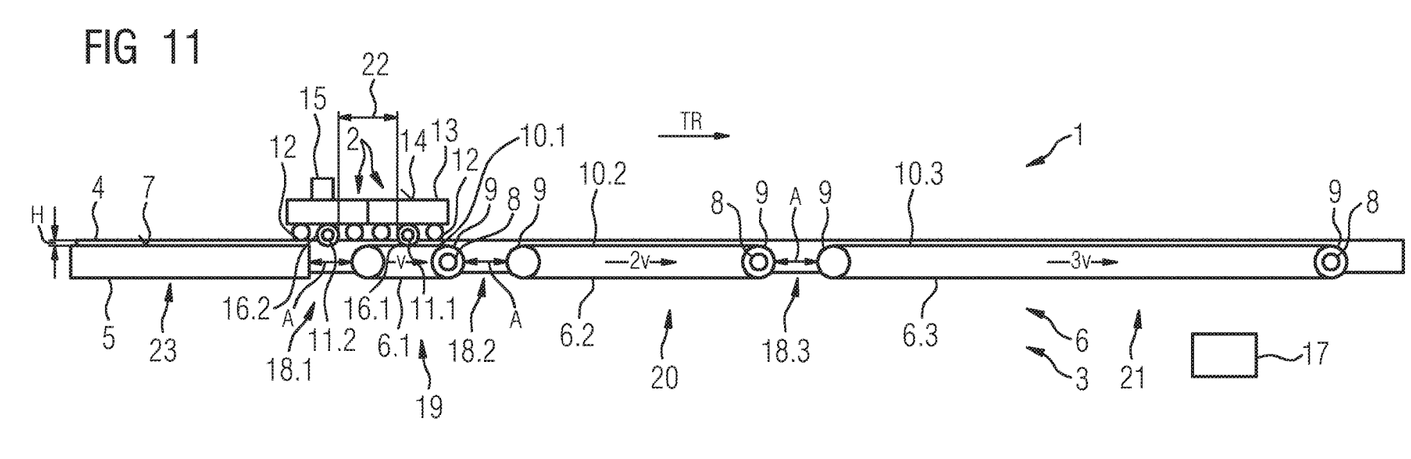

In the position in FIG. 10, the first on-board drive 11 with its friction wheel 16 has reached the first freewheeling section 18.1. The control unit 17 therefore switches off the first on-board drive 11.1. The second on-board drive 11.2 with its friction wheel 16.2 continues to be operatively connected to the contact rail 5. The second on-hoard drive 11.2 can drive the transport vehicle 2 until the second on-board drive 11.2 has reached the freewheeling section 18.1, as shown in FIG. 11. However, at the moment when the second on-board drive 11.2 has reached the freewheeling section 18.1, the first on-board drive 11.1 has already reached the first acceleration section 19 and is in contact with the belt conveyor 10.1. At all times, the transport vehicle 2 in the embodiment in FIGS. 9-16 therefore has contact with the contact rail 5 or one of the in-track drives 6 through at least one of the two on-board drives 11. Thus the control unit 17 can monitor and control the transport vehicle 2 at all times. As soon as the second on-board drive 11.2 has reached the freewheeling section 18.1, the first on-board drive 11, which has already reached the first acceleration section 19, can start up and accelerate the transport vehicle 2 relative to the belt conveyor 10.1.

Figure 12:
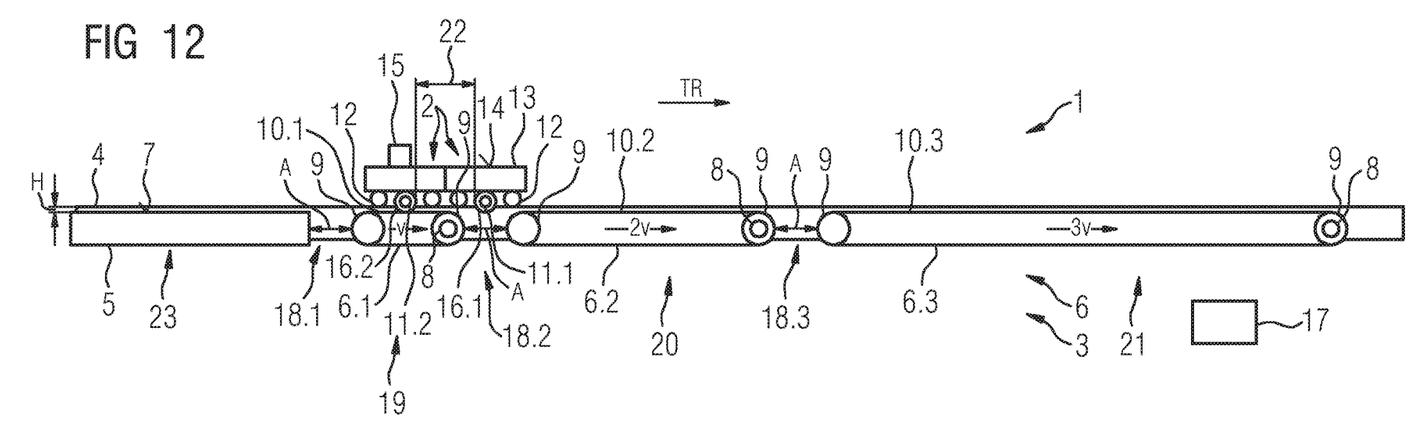
Figure 13:
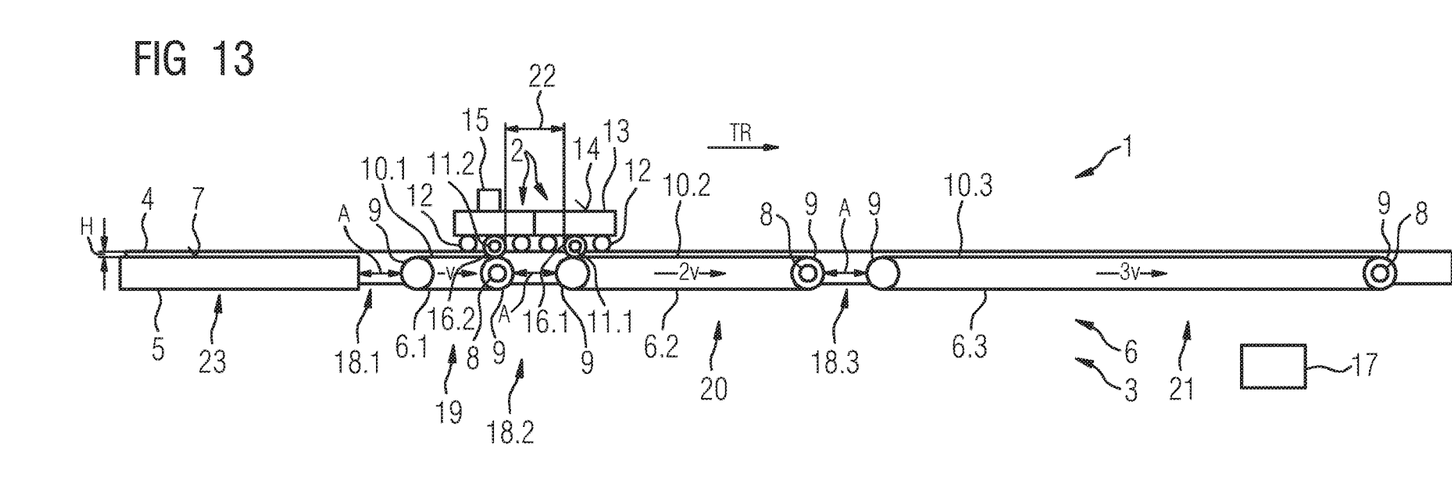
Figure 14:
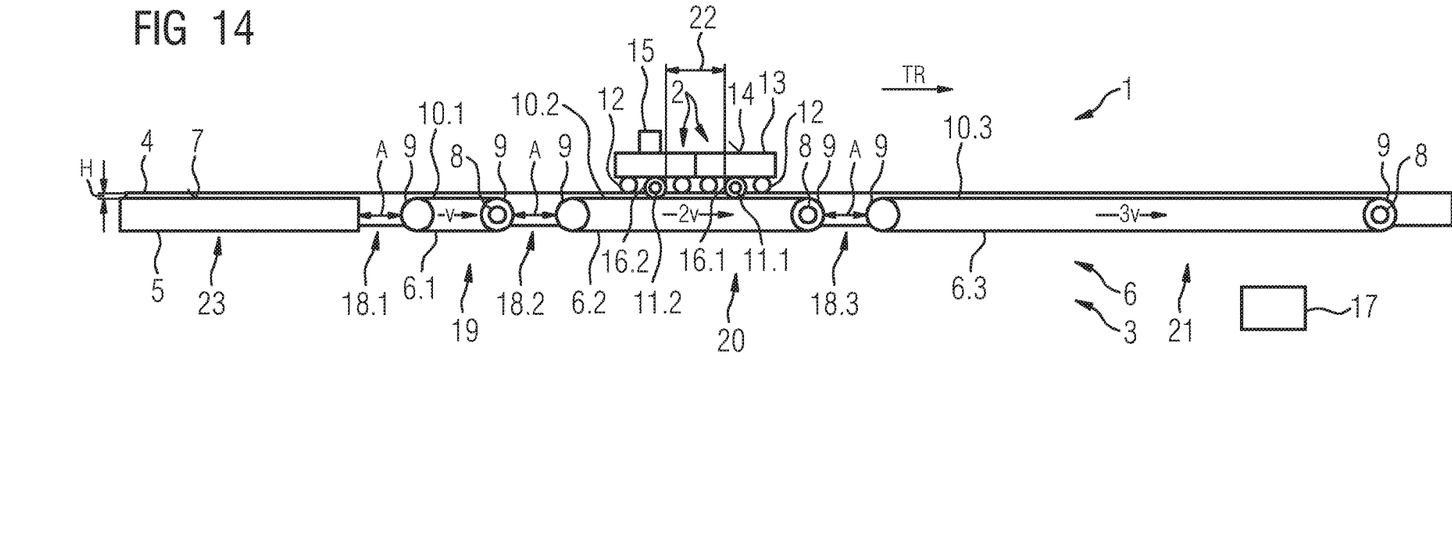
Figure 15:
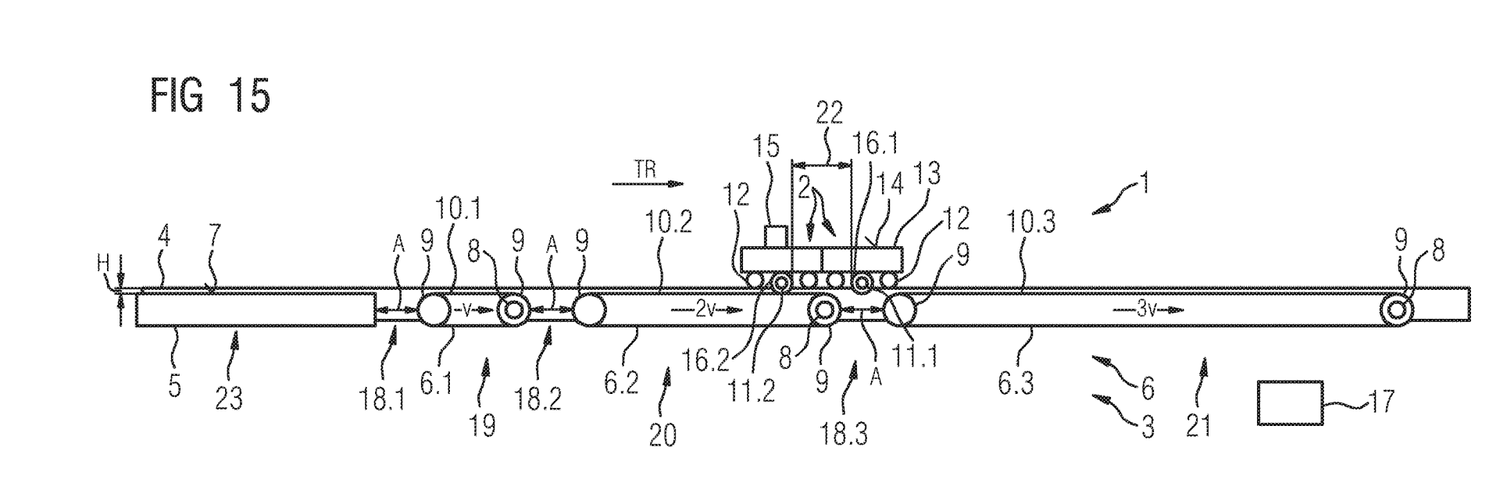
Figure 16:
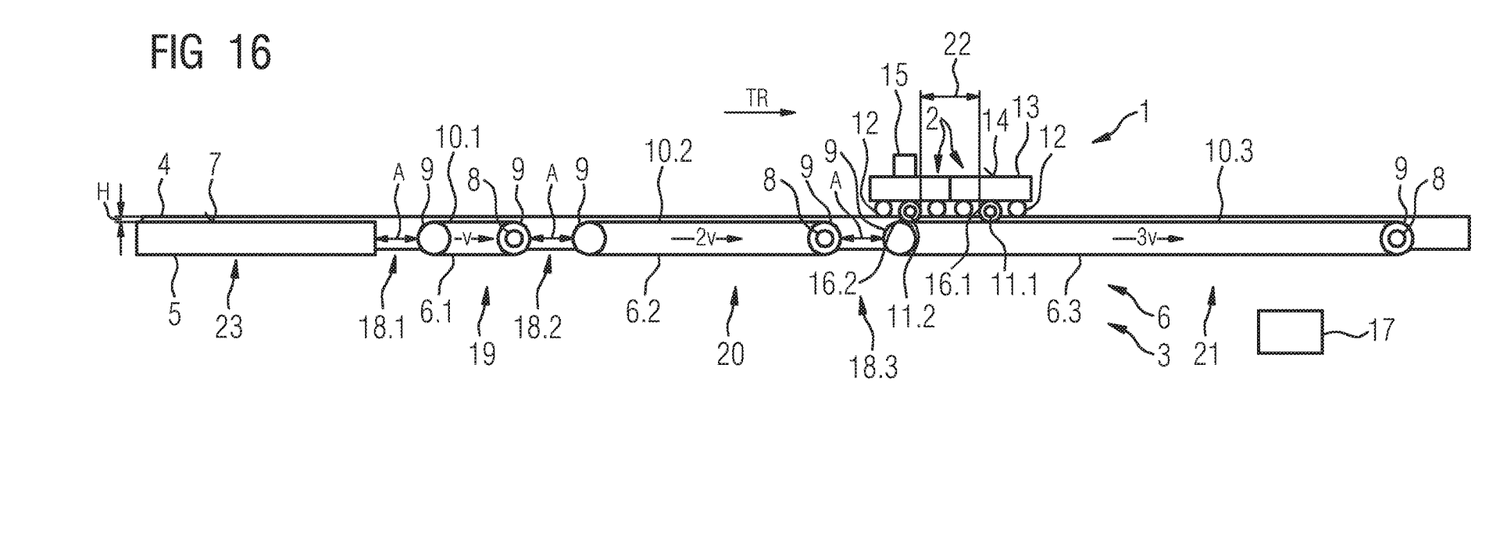

As in the embodiment in FIGS. 1-8, the transport vehicle 2 thus achieves twice the normal speed 2v at the end of the first acceleration section 19, as shown in FIG. 12. In the same way, the transport vehicle 2 moves over the next freewheeling section 18 and acceleration sections 20, 21 in order to be re-accelerated to four times normal speed 4v at the end.

The invention claimed is:

1. A transport device for transporting goods, the transport device comprising:
   at least one track;
   at least one transport vehicle constructed to travel on said at least one track and to transport the goods, said at least one transport vehicle having at least one on-board drive for moving said at least one transport vehicle relative to said at least one track; and
   a control unit;
   said at least one track having at least one in-track drive for moving said at least one transport vehicle relative to said at least one track at least in sections;
   said at least one track including a plurality of acceleration sections, each one of said plurality of acceleration sections having at least one in-track drive for moving said at least one transport vehicle relative to said one of said plurality of acceleration sections;
   said control unit configured for moving said at least one transport vehicle from one of said plurality of acceleration sections to another one of said plurality of acceleration sections by an inertia of said at least one transport vehicle without driving any onboard drive of said at least one transport vehicle; and
   said control unit configured for controlling said onboard drive of said at least one transport vehicle.

2. The transport device according to claim 1, wherein:
   said at least one on-board drive is configured to move said at least one transport vehicle at a variable transport speed; and
   said at least one in-track drive is configured to move said at least one transport vehicle at a constant transport speed.

3. The transport device according to claim 1, wherein:
said at least one in-track drive has at least one movable contact device; and
said at least one movable contact device can be at least temporarily operatively connected to said at least one in-track drive for producing a relative movement between said at least one transport vehicle and said at least one movable contact device.

4. The transport device according to claim 3, wherein said at least one track extends in a direction of travel, and said at least one track has at least one fixed contact device being temporarily operatively connected to said at least one on-board drive during operation and being disposed at a distance from said at least one in-track drive in said direction of travel.

5. The transport device according to claim 4, wherein said distance is made large enough to ensure that said at least one on-board drive is temporarily not operatively connected to said at least one track during passage of said at least one transport vehicle.

6. The transport device according to claim 1, wherein said at least one transport vehicle has at least two of said on-board drives disposed one behind the other in a direction of travel.

7. The transport device according to claim 1, wherein said at least one transport vehicle includes at least two transport vehicles being connected together and disposed one behind the other in a direction of travel.

8. The transport device according to claim 2, wherein:
said constant transport speed of said at least one in-track drive is substantially identical to a normal speed; and
said at least one on-board drive is configured to accelerate or decelerate said at least one transport vehicle to at least said normal speed.

9. The transport device according to claim 1, wherein said at least one in-track drive includes at least two in-track drives disposed one after another in a direction of travel, and said at least two in-track drives have different constant drive speeds.

10. The transport device according to claim 9, wherein said at least two in-track drives are disposed at a distance from one another in said direction of travel.

11. The transport device according to claim 10, wherein said distance is at least large enough to ensure that said at least one on-board drive is temporarily not operatively connected to said at least one track as said at least one transport vehicle passes.

12. The transport device according to claim 9, wherein said respective different drive speeds of said at least two in-track drives are substantially integral multiples of a normal speed, and said different drive speeds are increased or reduced by 1× said normal speed in said direction of travel.

13. The transport device according to claim 1, wherein said at least one on-board drive has at least one friction wheel.

14. The transport device according to claim 1, wherein said at least one in-track drive has at least one conveying device.

15. The transport device according to claim 1, wherein said at least one transport vehicle includes a vehicle body having a tilt tray.

* * * * *